United States Patent [19]
Reba et al.

[11] 3,829,070
[45] Aug. 13, 1974

[54] GASIFICATION SYSTEM

[75] Inventors: Imants Reba; Edward C. Wolthausen, both of Vancouver, Wash.

[73] Assignee: Crown Zellerback Corporation, San Francisco, Calif.

[22] Filed: Oct. 13, 1972

[21] Appl. No.: 297,555

[52] U.S. Cl. .............................. 261/77, 261/36 R
[51] Int. Cl. ............................................ B01f 3/04
[58] Field of Search ......................... 210/220; 261/76–78, 36, 25, DIG. 75

[56] References Cited
UNITED STATES PATENTS
3,677,525  7/1972  Schurig ........................ 261/77 X
3,704,008  11/1972  Ziegler ........................ 261/77 X

*Primary Examiner*—J. M. Meister
*Attorney, Agent, or Firm*—Thomas R. Lampe; Corwin R. Horton

[57] ABSTRACT

A system of gasifying a liquid utilizing the "Coanda effect." In the system a fluid is directed through a slit under pressure whereupon it attaches itself to a flow attachment surface and entrains the liquid to be gasified. A gas is admitted to the entrained liquid flow path with resultant high degree of turbulent mixing and high shear at the gas-liquid interface. This causes the formation of great numbers of small bubbles which are ejected along with the entrained liquid into the body of the liquid to be gasified.

15 Claims, 5 Drawing Figures

PATENTED AUG 13 1974

GASIFICATION SYSTEM

BACKGROUND OF THE INVENTION

The present invention relates to a system for gasifying a liquid. The term "liquid" as used herein shall mean any liquid or semi-liquid material. The invention is particularly described with reference to the aeration of water; however, the system may be used for the gasification of any liquid, such for example, to promote a chemical reaction between a gas and a liquid or to promote other desired activity such as the action of aerobic bacteria in the treatment of sewage, chlorination of swimming pools, and the like.

In the past, one method of aerating or otherwise gasifying a liquid has been to submerge an outlet for a gas beneath the surface of the liquid and pump the air or other gas at high pressures. It has been recognized that gasification is enhanced through the formation of small gas bubbles and high turbulence at the interface between the gas and the liquid. Perforated pipes and other arrangements have been used to accomplish this; however, such arrangements are characterized by their relative complexity, high cost of operation, and inefficiency per horsepower expended in their operation.

Relatively simple gasifiers have also been developed which use the power developed by the natural flow of streams, rivers or the like to aerate or otherwise gasify same. U.S. Pat. No. 3,489,396 may be referred to as an example of an arrangement of this type. While relatively simple in construction, such arrangements have the drawback that they are useful only in situations where there is a relatively rapid flow of liquid; thus, they are not effective in standing pools of water such as ponds, sloughs or the like.

The present invention provides a system of relatively inexpensive and simple construction which utilizes a phenomenon known as the "Coanda effect" to provide for the efficient gassification of a liquid through the expenditure of relatively little power. Through utilization of the present system a high degree of turbulent mixing and high shear is created at the gas-liquid interface with resultant formation of many small bubbles. The Coanda effect has been known for many years, as exemplified by U.S. Pat. No. 2,052,869, issued to Henri Coanda. Briefly, this phenomenon can be described as the tendency of a fluid, which emerges from a slit under pressure, to attach itself or cling to and follow a surface in the form of an extended lip of the slit, which lip recedes from the flow axis of the fluid as it emerges from the slit. This creates a zone of reduced pressure in the area of the slit so that relatively large quantities of a liquid or any other entrainable material which is in the zone will become entrained and flow with the fluid which has attached itself to the extended lip.

SUMMARY

According to the present invention the Coanda effect has been utilized to provide a high degree of turbulent mixing and high shear between a gas and the liquid being gassified. Apparatus constructed in accordance with the teachings of the present invention is placed in communication with the liquid to be gassified; for example, in water to be aerated. The apparatus incorporates a slit disposed adjacent to a flow attachment surface. A fluid, such as water, is introduced under pressure through such slit whereupon it attaches itself to the flow attachment surface by virtue of the Coanda phenomenon and entrains relatively large quantities of a liquid introduced into the system, as for example, from the ambient liquid within which the system is immersed. Air, or alternatively another type of gas, is admitted into the entrained liquid flow path at a preselected location or locations therealong to mix with both the entraining and entrained flow thereby causing a high degree of turbulent mixing and high shear at the liquid-gas interface with resultant formation of large quantities of small bubbles. The liquid-gas mixture is thereupon introduced into the body of liquid to provide for the gassification thereof. Because of the efficient utilization of the Coanda effect, vast quantities of liquid may be processed through the system with a relatively small expenditure of energy.

The system according to the present invention may take a number of forms. For example, the system may be adapted to maintain a fixed position with respect to the body of water. Alternatively, the system may be mounted for movement in the body of water as by means of a flotation raft.

BRIEF DESCRIPTION OF THE DRAWINGS

Embodiments of the present invention are illustrated in the accompanying drawings in which.

GENERAL DESCRIPTION

Figure 1:
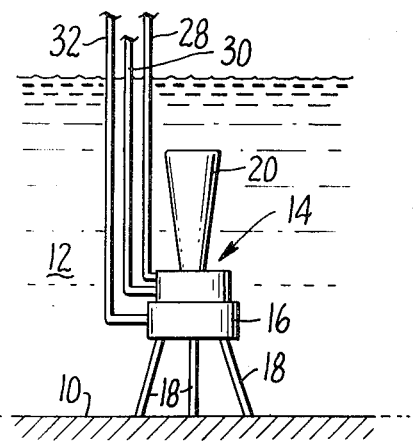
FIG. 1 is a generally diagramatic side view of one form of apparatus constructed in accordance with the principles of the present invention.
Figure 2:
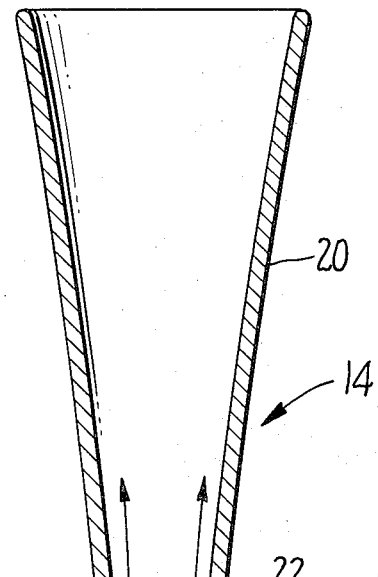
FIG. 2 is an enlarged cross-sectional view illustrating certain operational details of the apparatus of FIG. 1.
Figure 2:
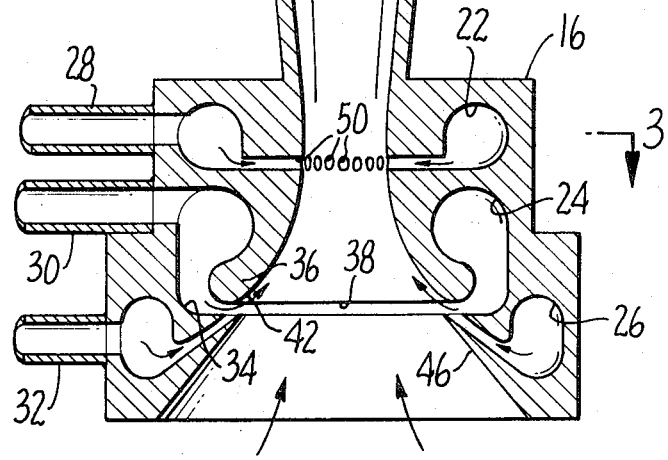
Figure 3:
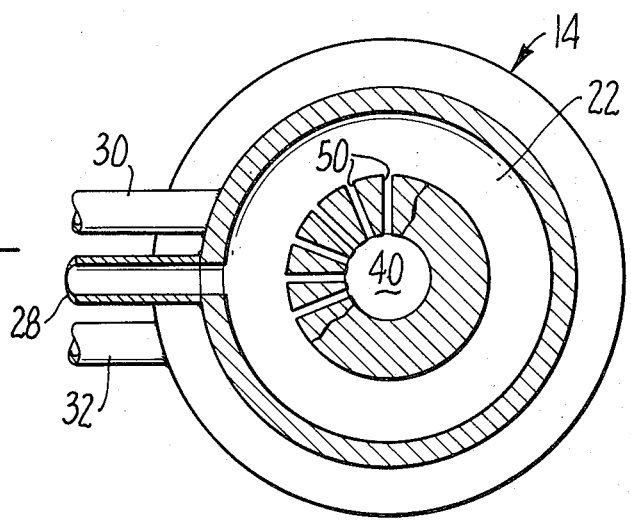
FIG. 3 is a view taken along line 3—3 of FIG. 2 with a portion of the structure being broken away to provide additional operational details thereof.

Referring now to FIGS. 1, 2 and 3, one form of apparatus incorporating the teachings of the present invention is illustrated. This particular embodiment is adapted for fixed position on the floor 10 of a body of liquid 12 which for descriptive purposes will be a body of water. However, it should be clearly understood that the teachings of this invention may be employed in other contexts such as fluid settling tanks, sewage treatment ponds, etc. The apparatus, which is generally designated by means of reference numeral 14, comprises a main body portion 16 mounted on legs 18 and a generally cone-shaped dispersion element 20.

With particular reference to FIGS. 2 and 3, body portion 16 has formed therein a plurality of spaced circumferential chambers 22, 24 and 26 which communicate, respectively, with the interiors of conduits 28, 30 and 32. At their other ends, conduits 28 and 32 are connected to a suitable source of air. If desired, the source of air for either or both of conduits 28 and 32 may be ambient air or, alternatively, a source of pressurized air such as a compressor (not shown). With the apparatus of this invention being in its simplest and least expensive form, the source of air will of course be the ambient atmosphere. Conduit 30, on the other hand, is connected to a suitable source (not shown) of pressurized fluid which for illustrative purposes in the present embodiment will be water. The water may be obtained from a high pressure main if such is available or any other source of pressurized water such as a water pump with its inlet in communication with body of water 12 or other water source.

Chamber 24, and hence the interior of conduit 30, is in communication with a flow path defined by circumferentially disposed curved segment 34 and downwardly projecting element 36 of body portion 16. Segment 34 and element 36 define a circumferentially disposed slit 38 through which the water passing through conduit 30 and chamber 24 passes as it exits into the central chamber 40 defined by main body portion 16. As the water exits from slit 38 it attaches itself to a circumferential curved fluid flow attachment surface 42 formed on the interior of downwardly projecting element 36 immediately adjacent to slit 38. This attachment is by virtue of the Coanda effect which is described in greater detail above. The water proceeds upwardly as shown by the arrows in FIG. 2 whereupon it enters the interior of cone-shaped dispersion element 20.

As the water proceeds upwardly it will serve to entrain liquid with which it comes into contact after exiting from slit 38 and attaching itself to flow attachment surface 42. In the arrangement shown, the entraining fluid will entrain air exiting from circumferential chamber 26 through an air flow path defined by the lower extent of curved segment 34 and in upwardly projecting element 46. In addition, the entraining fluid will entrain the ambient water of body of water 12 which is disposed within central chamber 40 in the vicinity of slit 38. As this ambient water is entrained and moves upwardly it will of course be replaced by still additional ambient water entering the bottom of apparatus 14 as shown by the arrows. In the vicinity of slit 38 extremely high shear and turbulent agitation conditions will be present, thereby causing the rapid mixing of the air and water and the formation of air bubbles which are caught up in the upward flow.

In the arrangement illustrated, additional air is introduced through a plurality of apertures 50 which provide communication between chamber 22 and central chamber 40. If desired, the air in conduit 28 and chamber 22 may be pressurized to force the air to pass through apertures 50 and into the upwardly moving stream. However, such pressurization is not necessary since passage of liquid through central chamber 40 past apertures 50 will induce flow of air therefrom into the central chamber because of the venturi configuration of apparatus 14.

Figure 4:
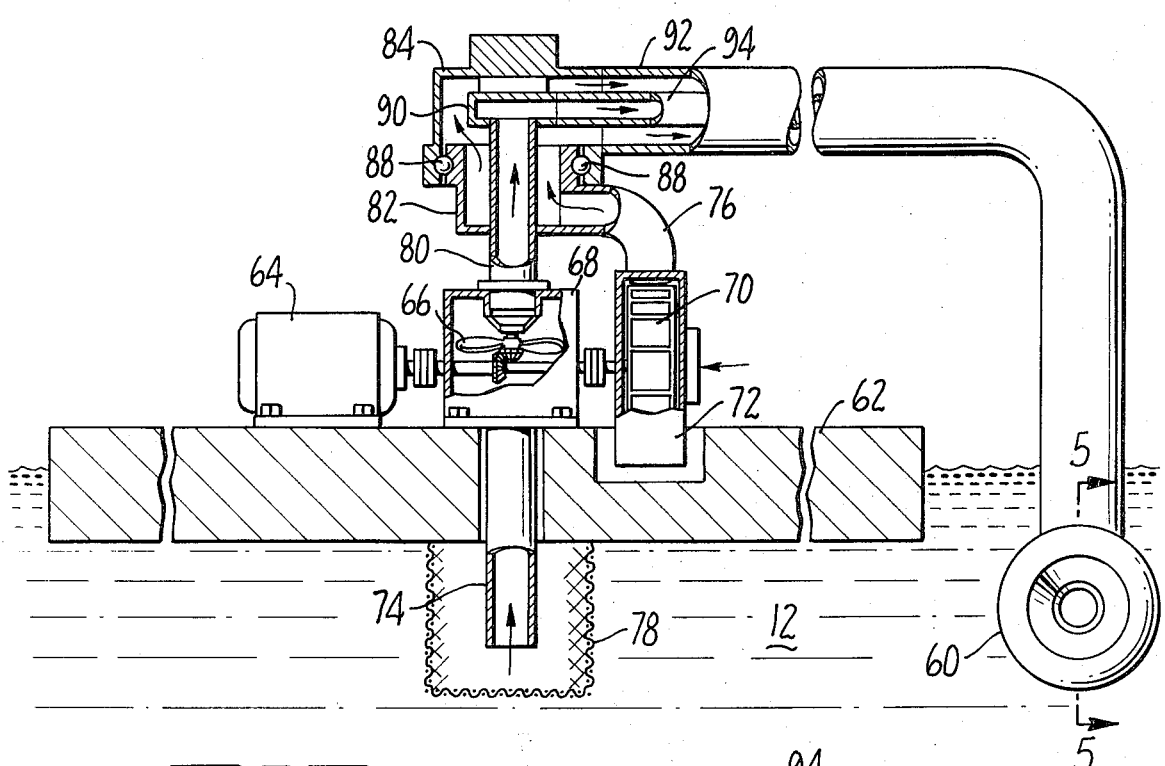
FIG. 4 is a generally diagramatic side view and partial section of an alternative embodiment of apparatus constructed in accordance with the teachings of the present invention.
Figure 5:
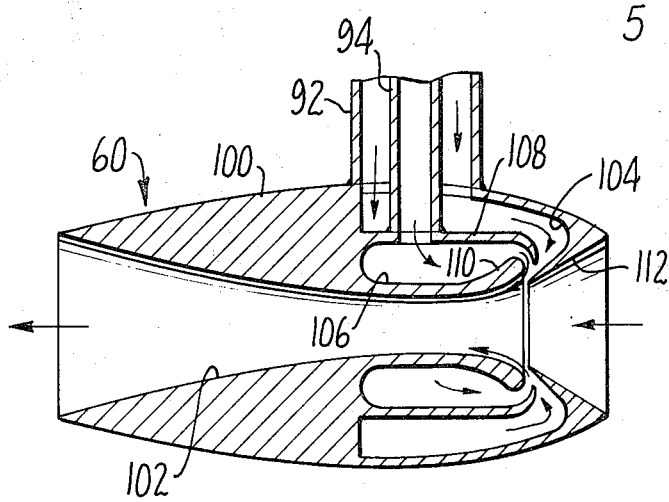
FIG. 5 is a cross-sectional view taken along line 5—5 of FIG. 4.

Referring now to FIGS. 4 and 5, an alternative form of apparatus 60 incorporating the teachings of the present invention is illustrated. Whereas the apparatus of FIGS. 1, 2 and 3 is one illustration of a stationary arrangement, the apparatus of FIGS. 4 and 5 provides an illustration of a mobile system adapted for movement about the body of water or other liquid on which it is employed.

Apparatus 60 includes a flotation raft 62 which is constructed of any suitable buoyant material and is adapted for flotation on the surface of body of liquid 12. Again, for purposes of illustration, the liquid will be considered to be water. Mounted upon raft 62 is a suitable prime mover such as electric motor 64 connected to a source of electrical energy. The drive shaft of the motor is coupled to an impeller 66 rotatably mounted within housing 68 through cooperating gearing disposed on the output shaft of motor 64 and the shaft of the impeller. The output shaft of the motor extends through the opposite side of the impeller housing 68 where it is coupled to the input shaft of a second impeller 70 rotatably disposed within a second impeller housing 72.

Upon actuation of motor 64, impellers 66 and 70 both rotate, the impeller 66 serving to draw water from the body of water 12 through an input conduit 74 extending through raft 62 into the body of water and impeller 70 serving to direct ambient air into the interior of impeller housing 72 and force it under pressure through air output conduit 76. The direction of flow of the ambient air and the water is illustrated by means of the arrows. If desired, a foraminous screen 78 may be disposed about the inlet of input conduit 74 to prevent the entry of solid matter into the conduit.

Affixed to the upper portion of impeller housing 68 and communicating with the interior thereof is a liquid outlet conduit 80 which defines a flow path for the water directed upwardly by impeller 66. Integrally connected to conduit 80 is a circular housing 82 which defines an annular chamber about conduit 80 which is in communication with the interior of conduit 76. At its open upper end circular housing 82 is also in communication with the interior of a fixture 84 disposed thereabove and attached thereto by bearings 88 which permit freely rotatable movement between circular housing 82 and fixture 84. An inner circumferentially disposed flange element 90 extends downwardly from the top of fixture 84 and bears upon suitable rotatable bearing structure disposed between the flange element 90 and the upper extent of conduit 80. Suitable seals (not shown) are provided at the aforedescribed bearing locations to provide fluid-tight connections between the relatively movable elements.

Integrally attached to fixture 84 are concentric pipes 92 and 94. The interior of the internally disposed pipe 94 is in communication with the interior of conduit 80 and thus provides a flow path for the water being pumped by the impeller 66. A second flow path is established between the annular space defined by pipes 92 and 94 and the space between outlet conduit 80 and circular housing 82 which, of course, is in communication with the interior of air conduit 76. The separate flow paths of the water and the air are illustrated by means of the arrows in FIGS. 4 and 5.

Pipes 92 and 94 extend generally horizontally a preselected distance beyond the outermost extent of raft 62 at which point a 90° bend is formed in the pipes and they extend downwardly below the surface of the body of liquid 12. Attached to the pipes 92 and 94 at the lowermost extent thereof is a nozzle member 100 which has a venturi-shaped throughbore 102 formed therein. Nozzle member 100 is provided with two spaced annular chambers 104 and 106 which are in communication, respectively, with the annular space formed between pipes 92 and 94 and the interior of pipe 94. Chamber 104 thus receives the air pumped by impeller 70 while chamber 106 receives the water pumped by impeller 66. Separation is maintained between chambers 104 and 106 by means of a circumferentially extending baffle 108 which is curved inwardly at the outermost extent thereof to cooperate with a bell-shaped extension 110 to define an annular slit through which water exits from chamber 106. Bell-shaped extension 110 has formed thereon at the vicinity of said slit a fluid flow attachment surface. By virtue of the Coanda effect, the water passing through the slit formed between baffle 108 and extension 110 attaches itself to the curved fluid flow attachment surface to move toward the left through throughbore 102 as viewed in FIG. 5 and as illustrated by the arrows. The entraining flow entrains and moves toward the left as viewed in FIG. 5 large quantities of water which enter the nozzle member 100 from the right hand side thereof. At the same time, air exits from chamber 104 through the annular slit formed between baffle 108 and inwardly extending element 112 of the nozzle member 100. There is a high degree of turbulent mixing and high shear created at the liquid-gas interface with resultant formation of many small bubbles, which along with the entrained water exits from the left hand side of the nozzle member 100 as viewed in FIG. 5.

The expulsion of the water-air mixture from the nozzle member causes it to act somewhat in the manner of a jet, thereby causing rotation of pipes 92 and 94 and the nozzle member 100 about raft 62 and the other elements of the apparatus fixedly attached thereto. Also, such action causes the raft to move in a random fashion over the surface of body of water 12. Because of this activity, virtually the entire extent of the pond or other body of water on which the apparatus of FIGS. 4 and 5 is utilized will be traversed thereby to assist in the aeration thereof. Of course, if an electric cable is used to provide power to the system the maximum extent of motion of the raft will be limited by the length of the cable. By using a self-contained power source, such as a gasoline engine, to power the system no such limitation is placed on the extent of travel of the raft about the body of water.

We claim

1. Apparatus for gassifying a body of liquid, including:
    means defining a flow path in communication with said body of liquid and leading to an exit aperture;
    means defining at least one slit communicating with said flow path at a predetermined location upstream from said exit aperture;
    means for injecting an entraining stream of fluid under pressure through said slit and into said flow path in a direction toward said exit aperture to entrain liquid disposed in said flow path an cause the entrained liquid to exit from said exit aperture; and
    means for introducing a gas into said flow path to mix with said entrained liquid.

2. The apparatus of claim 1 wherein said means for introducing said entraining stream of fluid into said throughbore includes a fluid flow attachment surface leading from said slit, said fluid flow attachment surface being positioned to direct the fluid attached thereto in a downstream direction.

3. The apparatus according to claim 1 wherein said slit is disposed circumferentially about said liquid flow path.

4. The apparatus according to claim 1 wherein said means for introducing a gas into said flow path includes means defining at least one passageway for said gas communicating with said flow path and means inducing a flow of said gas through said passageway and into said flow path.

5. The apparatus according to claim 1 wherein said means for introducing a gas into said flow path includes means defining at least one passageway for said gas communicating with said flow path and impeller means driven by a prime mover which exerts a positive pressure on the gas within said passageway.

6. The apparatus according to claim 4 wherein said inducing means comprises a venturi nozzle defining at least a portion of said flow path which causes a pressure reduction in the flow path in the vicinity of said passageway.

7. The apparatus according to claim 1 additionally including flotation means for supporting said apparatus on the surface of said body of liquid.

8. The apparatus according to claim 7 wherein said means defining a flow path for said liquid includes a nozzle member mounted for movement relative to said flotation means.

9. A method of gassifying a body of liquid, comprising the steps of:
    positioning means defining a liquid flow path in communication with said body of liquid so that a portion of said liquid occupies said flow path;
    injecting an entraining stream of fluid into said flow path at a predetermined location.
    directing the entraining stream of fluid so that it entrains and induces flow of said liquid along said flow path; and
    introducing a gas into said flow path to mix with the liquid therein and gassify said liquid.

10. The method according to claim 9 wherein the fluid is water.

11. The method according to claim 9 wherein the gas is air.

12. The method according to claim 9 wherein the entraining stream is directed by attaching it to a fluid flow attachment surface leading in a downstream direction from said predetermined injection location.

13. The method according to claim 12 wherein entrainment and induction of flow of said liquid is accomplished by creating a zone of reduced pressure in said flow path in the vicinity of said fluid flow attachment surface.

14. The method according to claim 9 wherein the entraining stream is injected into said flow path with a velocity sufficient to create a turbulent condition in said flow path whereby gas bubbles are formed in said liquid.

15. The method according to claim 9 wherein the entraining stream is injected through a slit surrounding said flow path.

* * * * *